(12) United States Patent
Bui et al.

(10) Patent No.: US 8,139,312 B2
(45) Date of Patent: Mar. 20, 2012

(54) TIMING ALTERNATIVE INTERVALS WITHIN A TIMING BASED SERVO BAND

(75) Inventors: Nhan Xuan Bui, Tucson, AZ (US); Giovanni Cherubini, Rueschlikon (CH); Reed Alan Hancock, Tucson, AZ (US); Jens Jelitto, Rueschlikon (CH); Kazuhiro Tsuruta, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 67 days.

(21) Appl. No.: 12/716,037

(22) Filed: Mar. 2, 2010

(65) Prior Publication Data
US 2011/0216434 A1 Sep. 8, 2011

(51) Int. Cl.
*G11B 5/584* (2006.01)
(52) U.S. Cl. ................................................. 360/77.12
(58) Field of Classification Search .................. None
See application file for complete search history.

(56) References Cited

U.S. PATENT DOCUMENTS

| | | | |
|---|---|---|---|
| 5,073,834 A | 12/1991 | Best et al. ................. 360/77.08 |
| 5,721,648 A | 2/1998 | Phan et al. ................. 360/78.09 |
| 6,021,013 A | 2/2000 | Albrecht et al. ................ 360/53 |
| 6,111,719 A * | 8/2000 | Fasen ......................... 360/77.12 |
| 6,122,117 A | 9/2000 | Aikawa ........................ 360/29 |
| 6,542,325 B1 * | 4/2003 | Molstad et al. ............. 360/77.12 |
| 6,580,581 B1 | 6/2003 | Bui et al. .................... 360/78.02 |
| 6,606,358 B1 | 8/2003 | Sutardja ....................... 375/345 |
| 6,842,305 B2 | 1/2005 | Molstad et al. ............. 360/77.12 |
| 6,879,457 B2 | 4/2005 | Eaton et al. .................... 360/75 |
| 6,985,543 B1 | 1/2006 | Sutardja ....................... 375/345 |
| 6,999,258 B2 | 2/2006 | Molstad et al. ................. 360/48 |
| 7,245,450 B1 | 7/2007 | Cherubini et al. .......... 360/73.12 |
| 7,333,291 B1 | 2/2008 | Fasen |
| 7,379,254 B2 | 5/2008 | Langlois et al. ............... 360/48 |
| 7,522,371 B2 | 4/2009 | Koski et al. ................ 360/77.12 |
| 7,529,061 B2 | 5/2009 | Bui et al. .................... 360/77.12 |
| 7,535,668 B2 * | 5/2009 | Bates et al. ................. 360/77.12 |
| 7,639,448 B2 * | 12/2009 | Haustein et al. ............ 360/77.12 |
| 7,649,708 B2 * | 1/2010 | Winarski et al. ............ 360/77.12 |
| 7,649,709 B2 * | 1/2010 | Winarski et al. ............ 360/77.01 |
| 7,679,858 B2 * | 3/2010 | Winarski et al. ............ 360/77.12 |
| 7,684,140 B2 * | 3/2010 | Taylor ......................... 360/77.12 |
| 7,920,356 B2 | 4/2011 | Bui et al. |
| 2007/0115578 A1 | 5/2007 | Winarski et al. |
| 2008/0117539 A1 | 5/2008 | Bui et al. ........................ 360/48 |

OTHER PUBLICATIONS

"Timing-Based Track-Following Servo for Linear Tape Systems", IEEE Transactions on Magnetics, vol. 34, No. 4, Jul. 1998, pp. 1872-1877.

* cited by examiner

*Primary Examiner* — Hoa T Nguyen
*Assistant Examiner* — James L Habermehl
(74) *Attorney, Agent, or Firm* — John H. Holcombe

(57) ABSTRACT

An alternative time interval is taken of a timing based servo band to determine lateral position of a servo read head. The servo band is arranged in a sequence bursts with non-parallel servo stripes in sequentially adjacent sub-frames of a linear tape. The timing intervals comprise at least a first time interval (A) between a first pair of non-parallel servo stripes of a sub-frame; and an alternative time interval (C) between a pair of non-parallel servo stripes intermediate the first time intervals (A), the alternative interval servo stripes of sequentially adjacent sub-frames comprising a second servo stripe of the first pair, and a first servo stripe of a sequentially succeeding first pair. Position signals are ratios involving the first and second time intervals.

29 Claims, 7 Drawing Sheets

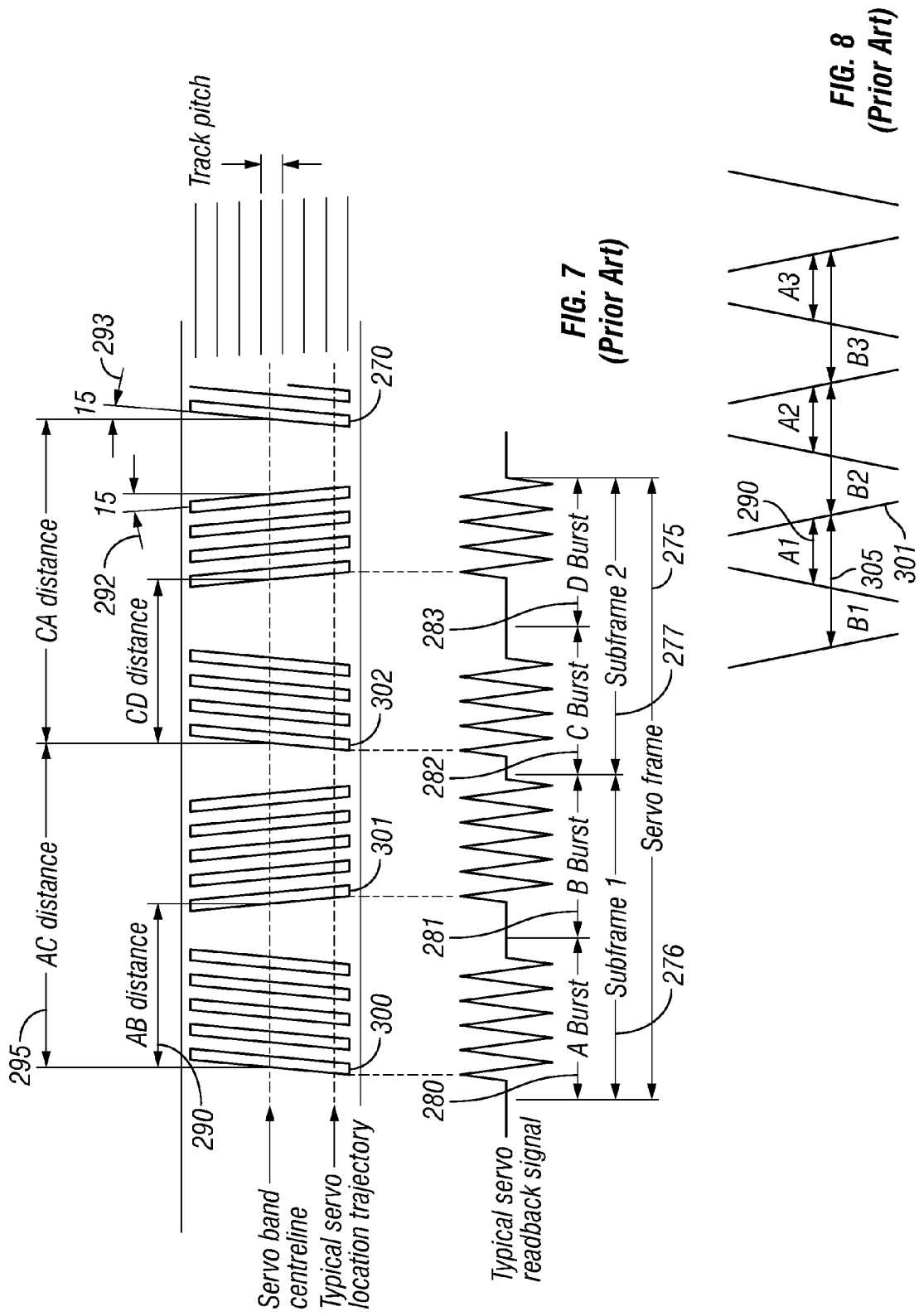
FIG. 7 *(Prior Art)*
FIG. 8 *(Prior Art)*

TIMING ALTERNATIVE INTERVALS WITHIN A TIMING BASED SERVO BAND

DOCUMENT INCORPORATED BY REFERENCE

Commonly assigned U.S. Pat. No. 5,689,384 is incorporated for its showing of timing based servo arrangements.

FIELD OF THE INVENTION

This invention relates to linear tape media, and more particularly to track following timing based servo arrangements.

BACKGROUND OF THE INVENTION

A linear tape is typically moved longitudinally across a read/write head so that the head can read and/or write data in parallel longitudinal data tracks along the tape. Servo bands are provided parallel to the data tracks, and at least one servo head reads the servo bands. A servo system responds to the lateral position of the servo read head to operate an actuator to move the read/write head transversely with respect to the tape to follow a particular path at the same lateral position with respect to the servo band, such that the read/write head follows the same data tracks.

Timing based servo arrangements are employed with respect to linear tape media, for example, in magnetic tape systems, to provide track following capability. Recorded servo patterns comprise dual magnetic transitions called "servo stripes" arranged as pairs recorded at more than one azimuthal orientation across the tape media. The technology is discussed in the incorporated U.S. Pat. No. 5,689,384. Reading a servo pattern by a servo read head yields a sequence of pulses called "dibits", where each dibit corresponds to the transitions at the edges of a servo stripe written on the magnetic medium. The timing between dibits that correspond to any pair of servo stripes with different azimuthal orientation thus varies continuously as the servo read head is moved in the lateral direction across the servo band. The pattern is read by a servo read head whose width is small compared to the servo band pattern, and servo read head position is derived from the relative timing of pulses generated by the servo read head reading the servo pattern as the tape is moved in the longitudinal direction. Position sensing with this system is achieved by deriving a ratio of two servo pattern intervals, one pattern interval comprising the timing between a transition of each of the dibits corresponding to a pair of servo stripes having different azimuthal orientation, and the other pattern interval comprising the timing between a transition of each of the dibits corresponding to a pair of servo stripes having the same azimuthal orientation. Thus, the position sensing is ratio dependent and is insensitive to tape speed.

The linear tape is typically subject to transverse movement as it is being moved in the longitudinal direction across the read/write head, and track following is employed to allow the read/write head to follow any transverse movement of the tape. The sensed position is employed for track following in which an actuator moves the read/write head transversely of the linear tape to attain a desired lateral position of the servo read head along the servo band and to trace a path following the servo band and thereby follow data tracks with data heads that are typically laterally offset from the servo read head. The sensed position is compared to the desired lateral position of the servo read head with respect to the servo band, and the difference is used to derive a position error signal and operate the actuator.

The primary need of the track following control system is to have a high sampling rate servo feedback signal to support a high bandwidth track following servo system. A high sampling rate provides up to date, accurate information of the read/write head. The timing based servo system measures the time between servo transitions of different bursts of servo transitions, for example, arranged in the form of subframes and frames, where a subframe comprises two bursts, and a frame comprises two subframes. The bursts of a subframe are separated by a first pattern interval or gap, and the subframes of a frame are separated by a second pattern interval or gap. The current timing based servo systems employ the time between servo transitions of two bursts of a subframe and the time between servo transitions of two subframes, such that the sampling rate encompasses a full frame. Thus, should tape velocity slow, the sampling rate may become too slow to sustain a high bandwidth track following system.

SUMMARY OF THE INVENTION

Methods, servo decoder systems, data storage drives, and computer program products are provided for providing timing information with respect to a timing based servo band arranged in a sequence of frames having sub-frames with non-parallel servo stripes in sequentially adjacent sub-frames of a linear tape, the timing based servo band sensed by a servo read head having a sensing width less than the width of the timing based servo band, the servo read head and the timing based servo band moved relative to each other in the longitudinal direction.

In one embodiment, the method comprises:

determining a first time interval (A) of the servo read head between a first pair of non-parallel servo stripes of a sub-frame;

determining a second time interval (B) of the servo read head between a second pair of parallel servo stripes of sequentially adjacent sub-frames, the second pair of servo stripes comprising one servo stripe of the first pair;

determining an alternative third time interval (C) of the servo read head between a third pair of non-parallel servo stripes intermediate first time intervals (A), the servo stripes of sequentially adjacent sub-frames, the third pair of servo stripes comprising one servo stripe of the first pair; and generating position signals that are a function of the first and second time intervals, and that are a function of the third and second time intervals, the position signals related to a lateral position of the servo read head with respect to the servo band.

In a further embodiment, the third time interval (C) third pair of servo stripes comprises a second servo stripe of the first pair, and a first servo stripe of a sequentially succeeding first pair.

In another embodiment, the function of the first and second time intervals comprises a ratio of (A) to (B), and the function of the third and second time intervals comprises a ratio of [(B) less (C)] to (B).

In still another embodiment, when the value of (A) is greater than the value of (B)/2, the step of generating position signals comprises generating position signals that are a function of the first and second time intervals as a ratio of (A) to (B); and when the value of (A) is less than the value of (B)/2, the step of generating position signals comprises generating position signals that are a function of the third and second time intervals as a ratio of [(B) less (C)] to (B).

A further embodiment comprises continuing to generate position signals without switching between the steps of generating position signals until the value of (A) differs from (B)/2 by at least a predetermined hysteresis factor.

In another embodiment, the method additionally comprises the step of determining a fourth time interval (D) of the servo read head between a fourth pair of parallel servo stripes of sequentially adjacent sub-frames, the fourth pair of servo stripes comprising servo stripes other than those of the second pair; and the step of generating the position signals comprises generating position signals that are a function of the first and second time intervals; and that are a function of the third and fourth time intervals.

In a further embodiment, the step of determining a second time interval (B) is between a second pair of parallel servo stripes of sequentially adjacent sub-frames; and the step of determining a fourth time interval (D) is between a fourth pair of servo stripes of sequentially adjacent sub-frames; the second pair of servo stripes and fourth pair of servo stripes interleaved with each other and non-parallel to each other pair.

In a still further embodiment, the function of the first and second time intervals comprises a ratio of (A) to (B), and the function of the third and fourth time intervals comprises a ratio of [(D) less (C)] to (D).

In another embodiment, the method comprises:

determining a first time interval (A) of the servo read head between a first pair of non-parallel servo stripes of a sub-frame;

determining a second time interval (C) of the servo read head between a second pair of non-parallel servo stripes intermediate first time intervals (A), the servo stripes of sequentially adjacent sub-frames, the second pair of servo stripes comprising a second servo stripe of the first pair, and a first servo stripe of a sequentially succeeding first pair; and generating position signals that are a function of the first (A) and second (C) time intervals, the position signals related to a lateral position of the servo read head with respect to the servo band.

In a further embodiment, the function of the first and second time intervals comprises a ratio of (A) to [(A) plus (C)].

In a still further embodiment, a sequentially updating function of the first and second time intervals comprises sequentially updating the ratio with an updated (A) alternating with an updated (C).

For a fuller understanding of the present invention, reference should be made to the following detailed description taken in conjunction with the accompanying drawings.

BRIEF DESCRIPTION OF THE DRAWINGS

FIG. 7 is a representation of an exemplary servo band of the prior art;

FIG. 8 is a representation of prior art timing information with respect to the servo band of FIG. 7;

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
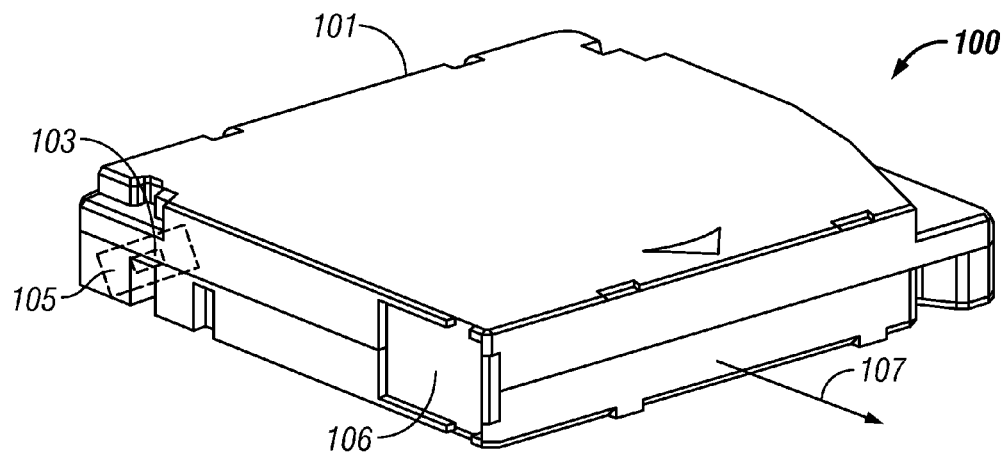
FIG. 1 is an illustration of a prior art magnetic tape cartridge.
Figure 2:
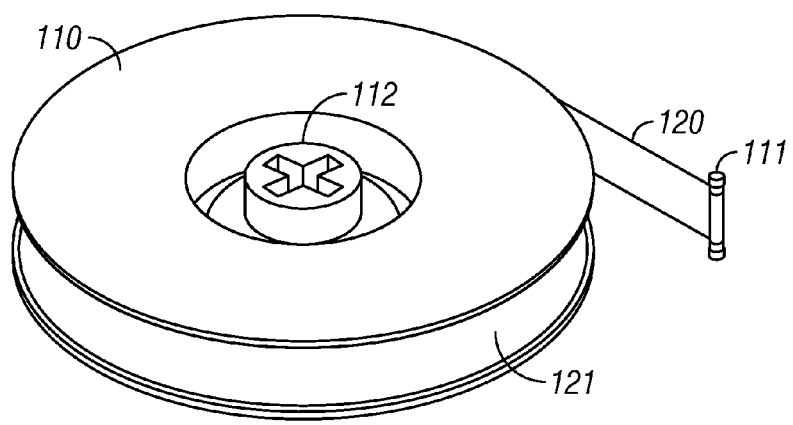
FIG. 2 is an illustration of a reel of magnetic tape of the magnetic tape cartridge of FIG. 1.

Referring to FIGS. 1 and 2, an example of prior art removable data storage media, such as a magnetic tape cartridge 100, comprises a cartridge body 101, cartridge door 106 and a data storage medium 121.

The data storage medium 121, for example comprising a rewritable magnetic tape, is wound on a reel 110, and a leader pin 111 is used to thread the magnetic tape 121 through the tape path of a magnetic tape drive. As is understood by those of skill in the art, a magnetic tape data storage cartridge comprises a length of magnetic tape wound on one or two reels, an example of which is those adhering to the Linear Tape Open (LTO) format. The illustrated magnetic tape cartridge 100 is a single reel cartridge. Magnetic tape cartridges may also comprise dual reel cartridges in which the tape is fed between reels of the cartridge.

One example of a magnetic tape data storage cartridge 100 is the IBM® 3580 Ultrium magnetic tape cartridge based on LTO technology. A further example of a single reel magnetic tape data storage cartridge is the IBM® 3592 TotalStorage Enterprise magnetic tape cartridge and associated magnetic tape drive. An example of a dual reel cartridge is the IBM® 3570 magnetic tape cartridge and associated drive.

In the tape cartridge 100, a brake button 112 is used to hold the tape reel 110 in place and to prevent it from rotating when tape cartridge 100 is not loaded in a tape drive. An optional tape leader 120 may be interposed between the leader pin 111 and the magnetic tape 121.

An auxiliary non-volatile memory 103, also called a cartridge memory (CM), for example, may be provided and retained in the cartridge 100, for example, by being encapsulated by the cartridge when it is assembled, as is understood by those of skill in the art.

Figure 3:
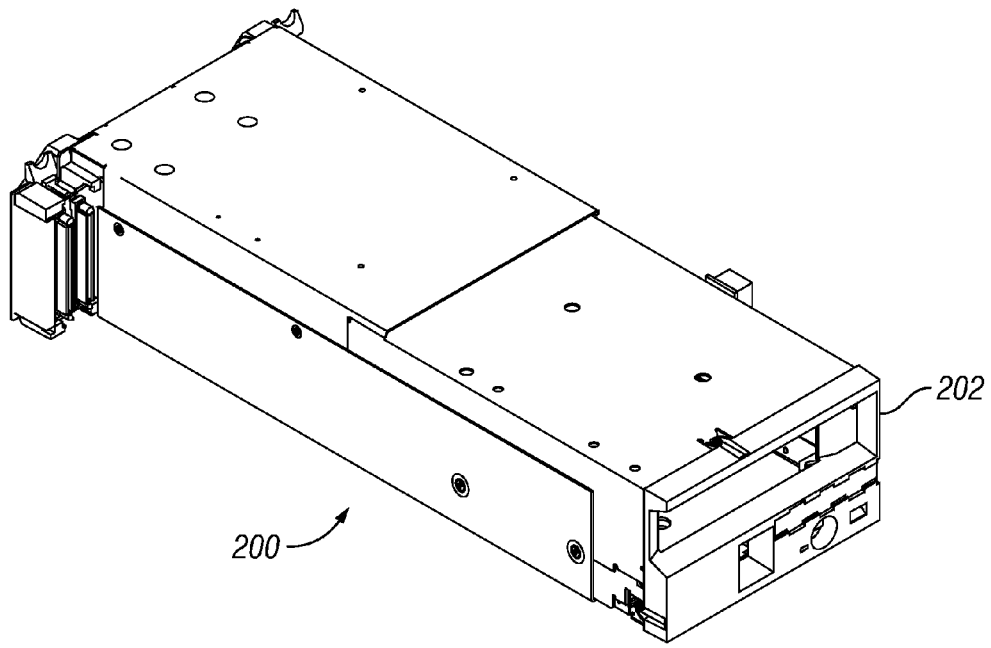
FIG. 3 is an illustration of a data storage drive which operates with the magnetic tape cartridge of FIGS. 1 and 2, which implements the present invention.
Figure 4:
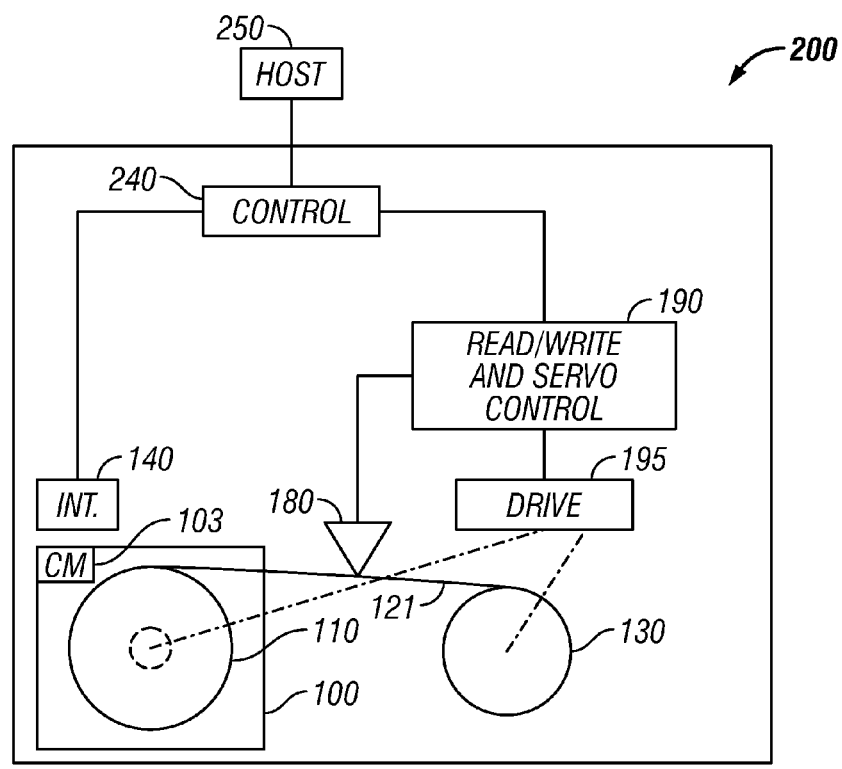
FIG. 4 is a block diagrammatic illustration of the data storage drive of FIG. 3.

Referring to FIGS. 3 and 4, a data storage drive, such as a magnetic tape drive 200, is illustrated. One example of a magnetic tape drive in which the present invention may be employed is the IBM 3580 Ultrium magnetic tape drive based on LTO technology, with microcode, etc., to perform desired operations with respect to the magnetic tape cartridge 100.

Referring to FIGS. 1-4, in the instant example, the magnetic tape cartridge 100 is inserted into opening 202 of the magnetic tape drive 200 along direction 107, and loaded in the magnetic tape drive 200.

The magnetic tape is threaded and fed between the cartridge reel 110 and a take up reel 130 in the magnetic tape drive. Alternatively, both reels of a dual reel cartridge are driven to feed the magnetic tape between the reels.

The magnetic tape drive comprises a memory interface 140 for reading information from, and writing information to, the auxiliary non-volatile memory 103 of the magnetic tape cartridge 100, for example, in a contactless manner.

A read/write system is provided for reading and writing information to the magnetic tape, and, for example, may comprise a read/write and servo read head system 180 with a servo system for moving the head laterally of the magnetic tape 121, a read/write servo control 190, and a drive motor system 195 which moves the magnetic tape 121 between the cartridge reel 110 and the take up reel 130 and across the read/write and servo head system 180. The read/write and servo control 190 controls the operation of the drive motor system 195 to move the magnetic tape 121 across the read/write and servo head system 180 at a desired velocity, and, in one example, determines the longitudinal location of the read/write and servo head system with respect to the magnetic tape 121, as will be discussed.

A control system 240 communicates with the memory interface 140, and communicates with the read/write system, e.g., at read/write and servo control 190. The control system 240 may comprise any suitable form of logic, including a processor operated by software, or microcode, or firmware, or may comprise hardware logic, or a combination, as discussed in greater detail hereinafter.

The control system 240 typically communicates with one or more host systems 250, and operates the magnetic tape drive 200 in accordance with commands originating at a host. Alternatively, the magnetic tape drive 200 may form part of a subsystem, such as an automated data storage library, and may also receive and respond to commands from the subsystem.

As illustrated, the control system 240 operates the magnetic tape drive 200 to perform operations in accordance with received commands. Examples comprise moving the tape to a desired location, reading data such as a file from the tape, writing data such as new data files to the tape, or appending new data to existing files or appending new data or data files to an existing data file of a partition, rewriting or appending indexes, etc.

Figure 5:
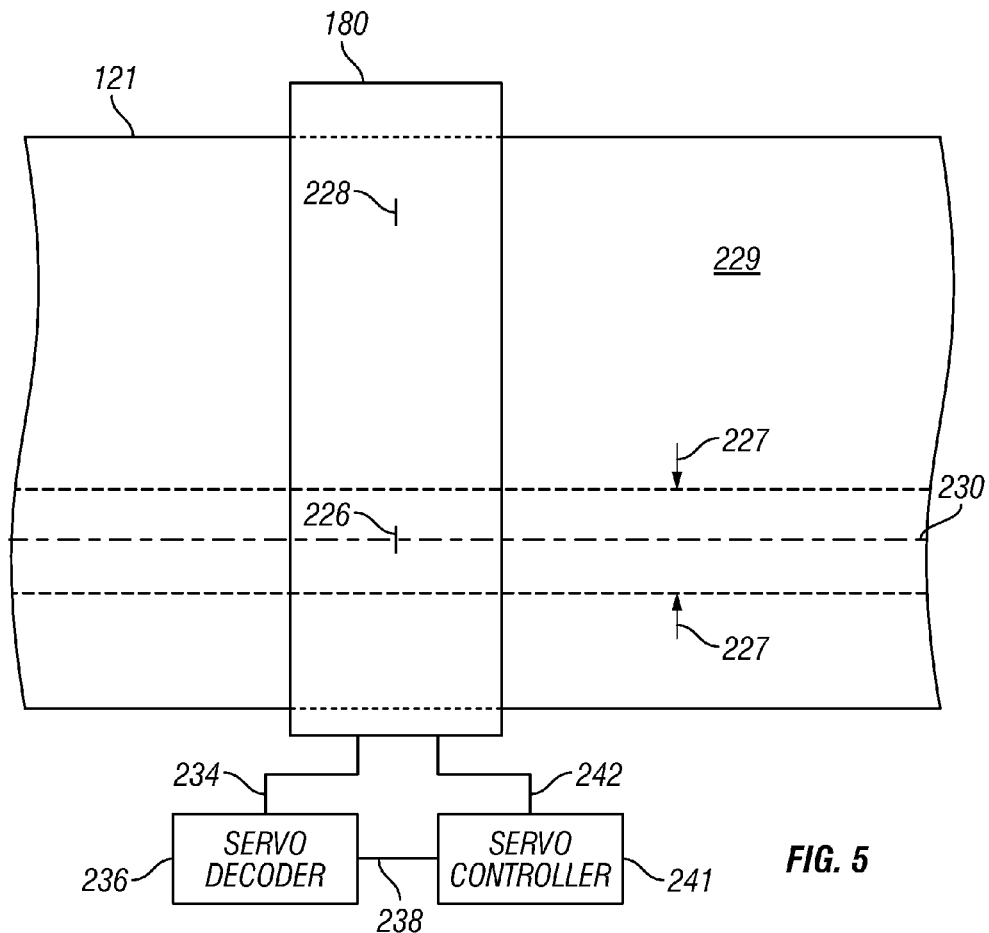
FIG. 5 is a schematic and block diagram of a magnetic head and servo system of the data storage drive and the magnetic tape cartridge of FIGS. 1-4.
Figure 6:
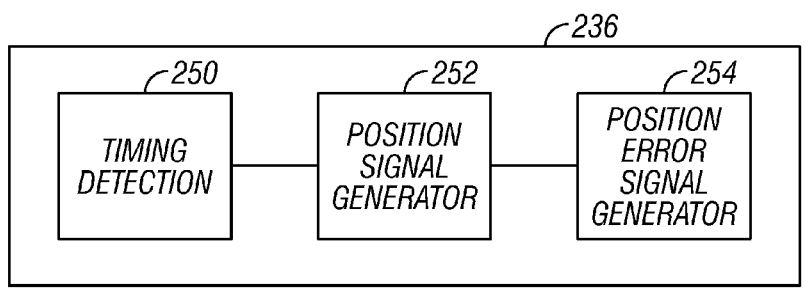
FIG. 6 is a schematic and block diagram of a servo decoder of FIG. 5.

Referring to FIGS. 5 and 6, the magnetic tape 121 is drawn across a head system 180, which comprises a servo read head 226 that detects a servo pattern recorded in a servo band 227 of the tape. A data head 228 of the head system 180 is positioned over a data track region 229 of the tape, for example comprising multiple data heads for reading data recorded in a data track or tracks, or for writing data in a data track or tracks. FIG. 5 shows a single servo read head and a single data head for simplicity of illustration. Those skilled in the art will appreciate that most tape systems have multiple parallel servo bands, multiple servo read heads, and multiple data read and write heads.

The servo band centerline 230 is shown as extending along the length of the tape 121. As discussed in the incorporated U.S. Pat. No. 5,689,384, the servo band is employed for track following in that magnetic transitions on the servo band are sensed by the servo read head and provided on servo signal line 234 to a signal decoder 236. An embodiment of the signal decoder is illustrated in more detail in FIG. 6, and a timing detection module 250 processes the servo read head signal and detects the timing between various encountered transitions of the servo band. Position signal generator 252 generates a position signal that indicates the present lateral position of the servo read head with respect to the servo band, and position error signal generator 254 compares the present lateral position to a desired lateral position and transmits a position error signal via position signal lines 238 to a servo controller 241. The servo controller generates a servo control signal and provides it on control lines 242 to a servo positioning mechanism at head system 180 which moves the head assembly laterally with respect to the servo band to a desired lateral position or to maintain the servo read head at a desired lateral position with respect to the servo band 227 during track following.

The terms "servo band" and "servo track" have been used interchangeably as the term to identify a linear stream of servo stripes. Since the servo read head may be positioned at any of several lateral positions across the servo band and the servo signals may be employed to track follow at a particular lateral position, the term "servo band" is employed herein to indicate a physical region which is occupied by servo stripes and avoid confusion arising from the expression "track following".

FIG. 7 illustrates a timing based servo pattern in accordance with the prior art. A timing based servo arrangement provides track following capability. In the example, a recorded servo pattern comprises dual magnetic transitions called a "servo stripe" 270, and having leading or trailing (depending on the direction of movement of the tape) edges. The pattern is read by a servo read head whose width is small compared to the servo band pattern, and the servo read head generates two opposite pulses called a "dibit" when the servo read head crosses a servo stripe as the tape is moved longitudinally across the servo read head.

A typical way to determine which servo stripe is being read is to arrange the servo stripes into patterns of bursts, and arranging the bursts into servo frames 275, each frame having two sub-frames 276, 277, each with two bursts 280, 281 and 282, 283 of servo stripes arranged in different azimuthal orientations. A pattern interval is provided within a subframe, and another pattern interval is between sub-frames. Typically, frames and sub-frames are distinguished by having a different number of servo stripes in the bursts of one subframe as compared to the other sub-frame. As one example, the frames and sub-frames are easily distinguished by observing the counts of dibits in the servo signal obtained from each burst, such as 5 dibits in each burst 280, 281 of sub-frame 276, and 4 dibits in each burst 282, 283 of sub-frame 277, within a frame 275. Counting the different numbers of dibits in each burst allows the servo system to distinguish the frame boundaries.

Referring to FIGS. 7 and 8, servo stripes are arranged as pairs, such as pair 290 recorded at more than one azimuthal orientation 292, 293 across the tape media. The technology is discussed in the incorporated U.S. Pat. No. 5,689,384. The servo read head traverses the servo stripes, generating a dibit for each servo stripe. The timing between a transition of each of the dibits of any pair, which are obtained from the servo read head, one from each burst within a subframe, thus varies continuously as a read head is moved in the lateral direction across the servo band. The servo read head position is derived from the relative timing of pulses generated by the head reading the servo pattern as the tape is moved in the longitudinal direction. Position sensing with this system is achieved by deriving a ratio of two servo pattern intervals, one pattern interval comprising the timing between a transition of each of the dibits obtained from servo stripes 290 having different azimuthal orientation, and the other pattern interval comprising the timing between a transition of each of the dibits obtained from servo stripes 295 having the same azimuthal orientation. Thus, the position sensing is ratio dependent and is insensitive to tape speed.

The uses of the terminology "A", "B", "C" and "D" for the bursts, and "A" and "B" for the timing between selected stripes is as defined in the art, may give an inconsistent appearance to those not of skill in the art. For example, the distance between a servo stripe 300 of burst "A" and a corresponding servo stripe 301 of burst "B" of the same azimuthal orientation is called the "AB" distance and is also called the (A) timing interval 290. The distance between a servo stripe 300 of burst "A" and a corresponding servo stripe 302 of burst "C" is called the "AC" distance and is also called the (B) timing interval 295. In practice, the (B) timing interval 305 may be shifted by one burst so that both the (A) and (B) timing interval are from the same instance, servo stripe 301.

In current technology, the value of the (A)/(B) ratio is used to determine the lateral position of the head relative to the servo band. The ratio is thus determined at the end of both an (A) timing determination and a (B) timing determination, and the information is made available to the servo system for head positioning control at a data rate in accordance with the timing determination.

Figure 9:
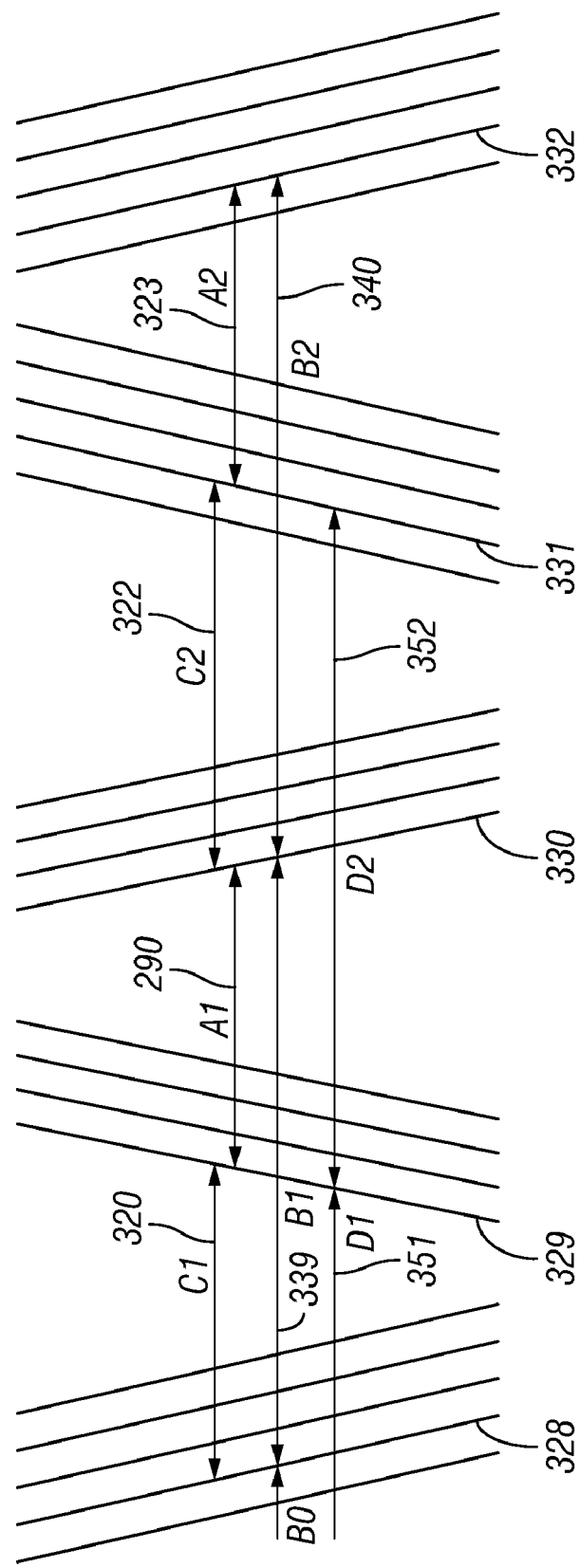
FIG. 9 is a representation of timing information provided in accordance with the present invention with respect to the servo band of FIG. 7.
Figure 10:
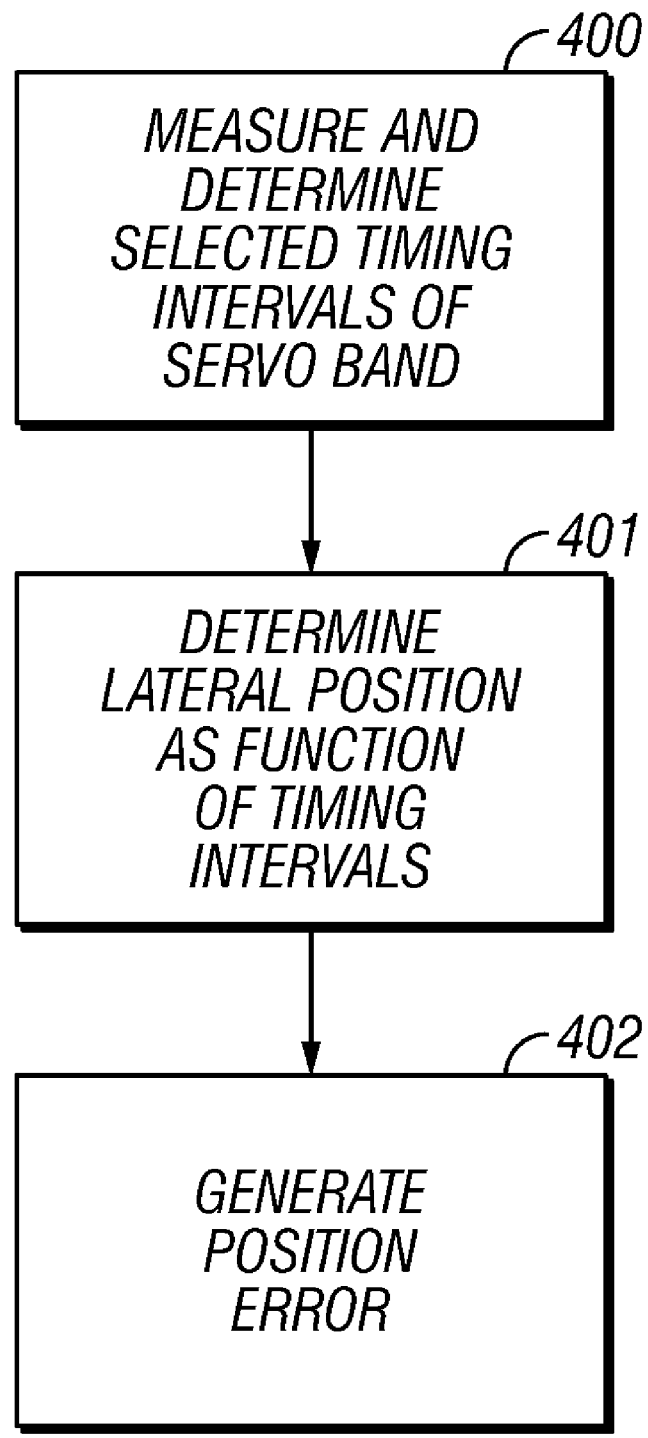
FIG. 10 is a flow chart depicting operation of the apparatus of FIGS. 5 and 6.

Referring to FIG. 9, the present invention adds the determination of an alternative third time interval (C) 320, 322 of the servo read head intermediate the first time intervals (A) 290, 323, between a third pair of non-parallel servo stripes of sequentially adjacent sub-frames. For example, third time interval (C2) 322 is between a pair of servo stripes 330 and 331, which are non-parallel. The servo stripes comprising the third timing interval (C2) are a second servo stripe 330 of the first pair of the previous (A1) timing interval 290, and a first servo stripe 331 of a sequentially succeeding first pair of the next (A2) timing interval 323.

The timing interval (C) provides the basis for an update to the lateral positioning of the servo read head intermediate that provided by the adjacent (A) timing intervals, thereby effectively doubling the rate of generation of lateral position estimates. The updated position value equivalent to the (A)/(B) ratio is [(B)−(C)]/(B).

In other words, the position signals become a function of the first and second time intervals comprising a ratio of (A) to (B), and a function of the third and second time intervals comprising a ratio of [(B) less (C)] to (B).

From a timing perspective, (A) and (C) in general may vary depending on lateral tape motion and tape velocity fluctuations, such that (B) is not necessarily equal to (C)+(A). The third timing interval (C) value has newer, or more up to date, information than the previous (A) or (B) value.

Referring to FIGS. 5, 6, 9 and 10, in step 400, the timing detection 250 is similar for the timing interval (A) and for the timing interval (C). The timing detection module 250 processes the servo read head signal and detects the timing between various encountered transitions of the servo band. In one example, the transitions are decoded, for example, by the number of dibits in a burst in accordance with the 4, 4, 5, 5 pattern, and the position of the selected transitions within the pattern, for example, to detect the transition 329 comprising the beginning of the (A1) timing interval 290 and to detect the transition 330 comprising the end of the (A1) timing interval. In one example, the timing detection module 250 employs a counter to count clock pulses between the detection of the transition 329 and the detection of transition 330, that count representing the timing interval (A1) 290. Once the count is completed for (A1), the same or a different counter is used to count clock pulses between the detection of transition 330 and the detection of transition 331, that count representing the timing interval (C2) 322. At the same time, the timing interval (B) is determined, either by conducting a count between the detection of transition 328 and transition 330, or by summation of the timing intervals (C1) 320 and (A1) 290, which summation is between the same transitions 328 and 330.

In step 401, position signal generator 252 generates a position signal that indicates the present lateral position of the servo read head with respect to the servo band, using both the (A)/(B) ratio and the [(B)−(C)]/(B) ratio.

In step 402, position error signal generator 254 compares the present lateral position to a desired lateral position and transmits a position error signal via position signal lines 238 to a servo controller 241. The servo controller generates a servo control signal and provides it on control lines 242 to a servo positioning mechanism at head system 180 which moves the head assembly laterally with respect to the servo band to a desired lateral position or to maintain the servo read head at a desired lateral position with respect to the servo band 227 during track following.

In FIG. 9, it might be argued that the most up to date value of the servo read head with the [(B)−(C)]/(B) ratio with (C2) interval 322 would be to wait for completion of the (B2) interval 340 measurement. However, to do so would provide no newer information than (A2) 323 with respect to (B2). However, the value of (B) is fixed from a tape position standpoint. (B) only varies with tape velocity. Since tape velocity changes are relatively slow compared to lateral (head position) changes, a safe assumption is that the tape velocity and therefore the (B) interval remains relatively constant across at least a few samples. Therefore, the new position value is determined at the timing point that (C2) 322 becomes available by using the previous (B) value 339.

Thus, in FIG. 9, the head position calculation sequence at the increased sampling rate becomes [(B0)−(C1)]/(B0), (A1)/(B1), [(B1)−(C2)]/((B1), (A2)/((B2), etc. Referring to FIG. 7, the increase in the timing detection rate 250 effectively increases the position error signal sampling rate 254.

In another embodiment, referring to FIG. 9, the issue of the "older in time" (B) value is solved in that a fourth time interval "(D)" 351, 352 of the servo read head is employed which is between a fourth pair of parallel servo stripes of sequentially adjacent sub-frames. The pair of servo stripes forming the fourth timing interval (D) comprises servo stripes other than those of the second pair forming timing interval (B), the second pair of servo stripes (B) and fourth pair of servo stripes (D) interleaved with each other and non-parallel to each other pair. This provides a more up to date measurement of the fixed servo pattern distance typically measured as (B).

The function to determine the lateral position of the head with the first and second time intervals comprises a ratio of (A) to (B), and the function with the third and fourth time intervals comprises a ratio of [(D) less (C)] to (D). The new sequence becomes [(D1)−(C1)]/(D1), (A1)/(B1), [(D2)−(C2)]/(D2), (A2)/(B2), etc.

Further, an alternative to improve the quality of the position error estimates at low velocity, but leaving the sample rate unchanged, comprises determining the lateral location of the servo read head with respect to the centerline of the servo band.

Specifically, when the value of (A) is greater than the value of (B)/2, the step of generating position signals comprises generating position signals that are a function of the first and second time intervals as a ratio of (A) to (B); and when the value of (A) is less than the value of (B)/2, the step of generating position signals comprises generating position signals that are a function of the third and second time intervals as a ratio of [(B) less (C)] to (B). When the value of (A) is greater than the value of (B)/2, the value of (A) is always greater than that of [(B)-(C)], or [(D)-(C)], allowing the count 250 of FIG. 6 to be greater and providing a more precise position ratio 252. When the servo read head is on the opposite side of the centerline of the servo band, the value of [(B)-(C)], or [(D)-(C)] is greater than the value of (A).

To avoid excessive toggling back and forth when the servo read head is close to the centerline, a further embodiment comprises continuing to generate position signals without switching between the steps of generating position signals until the value of (A) differs from (B)/2 by at least a predetermined hysteresis factor. For example, a narrow band may be formed around the center position, in which no change is made in the way the position signals are generated, and only if the narrow band is fully crossed is the mode switched. The band may for example be defined as "2Δ" and be a distance of "Δ" on each side of the center. Thus, the formula is if [(B)/2]-Δ<=(A)<=[(B)/2]+Δ, continue with the existing mode.

Figure 11:
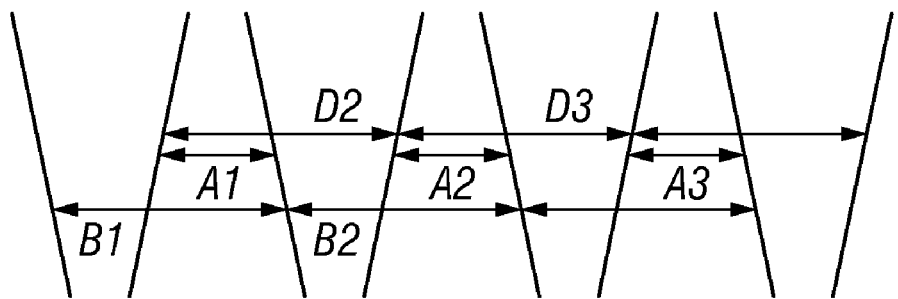
FIG. 11 is another representation of timing information provided in accordance with the present invention with respect to the servo band of FIG. 7.

Referring to FIG. 11, it may be noted that the relationships between the timing intervals allows the possibility to eliminate certain time intervals and still obtain valid position signals. The example of FIG. 11 is back at the original sample rate, which can be called "1x", but gives updated tape velocity consideration. The (C) timing interval is eliminated and the (D) timing interval retained, so that the sampling sequence is (A1)/(B1), (A1)/(D2), (A2)/(B2), (A2)/(D3), etc.

Figure 12:
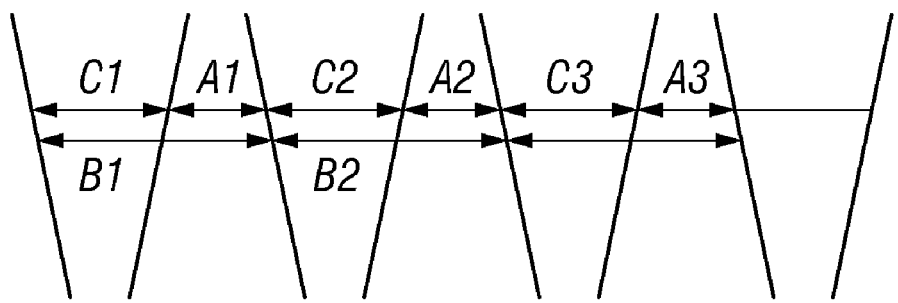
FIG. 12 is still another representation of timing information provided in accordance with the present invention with respect to the servo band of FIG. 7.

Alternatively, referring to FIG. 12, the (D) timing interval may be eliminated, and is also back at the original sampling rate "1x". The (C) timing interval is retained, so the sampling sequence is (A1)/(B1), (A1)/[(A1)+(C2)], (A2)/(B2), (A2)/[(A2)+(C3)], etc.

Figure 13:
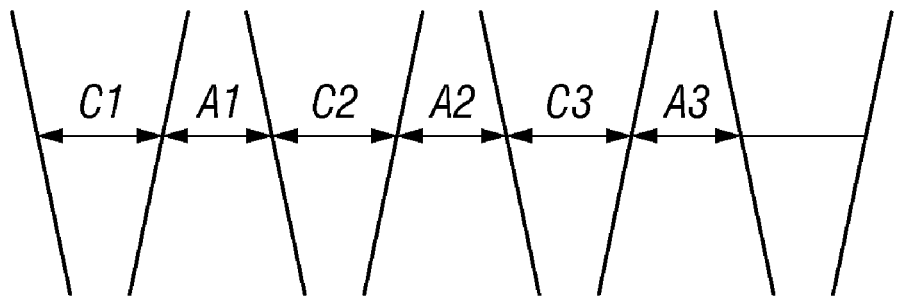
FIG. 13 is another representation of timing information provided in accordance with the present invention with respect to the servo band of FIG. 7.

By observing that (B)=[(A)+(C)], the number of measured intervals may be further reduced to eliminate measurement of the (B) interval and reduce the measured times to just two. In one embodiment, in FIG. 13, the (B) interval is not measured. Under a "1x" sampling rate, the sequence is (A1)/[(A1)+(C1)], (A2)/[(A2)+(C2)], (A3)/[(A3)+(C3)], etc.

Under a "2x" sampling rate, the sequence is (A1)/[(A1)+(C1)], (A1)/[(A1)+(C2)], (A2)/[(A2)+(C2)], (A2)/[(A2)+(C3)], (A3)/[(A3)+(C3)], etc.

The "2x" sampling is a method that allows use of the current system that determines only (A) and (B) in that the same implementation of two counters may be employed to determine (A) and (C).

The "2x" sampling rate provides sequentially updated position signals by updating (A) and (C) in an alternating fashion. Thus, as discussed above, first (C1) is updated to (C2), then (A1) is updated to (A2), and then (C2) is updated to (C3), etc. Unlike the updates involving (B), the updates involving only (C) are to the denominator of the ratio. Although (B) is unchanged regardless of the lateral position of the servo read head, (C) is between non-parallel servo stripes and reflects changes in the lateral position of the servo read head, such that the above ratio gives the lateral position.

Thus, referring to FIGS. 6, 9, 10 and 13, in step 400, the timing detection 250 is similar for the timing interval (A) and for the timing interval (C). The timing detection module 250 processes the servo read head signal and detects the timing between various encountered transitions of the servo band. In one example, the transitions are decoded, for example, by the number of dibits in a burst in accordance with the 4, 4, 5, 5 pattern, and the position of the selected transitions within the pattern, for example, to detect the transition 329 comprising the beginning of the (A1) timing interval 290 and to detect the transition 330 comprising the end of the (A1) timing interval. In one example, the timing detection module 250 employs a counter to count clock pulses between the detection of the transition 329 and the detection of transition 330, that count representing the timing interval (A1) 290. Once the count is completed for (A1), the same or a different counter is used to count clock pulses between the detection of transition 330 and the detection of transition 331, that count representing the timing interval (C2) 332.

In step 401, position signal generator 252 generates a position signal that indicates the present lateral position of the servo read head with respect to the servo band, using the (A)/[(A)+(C)] ratio.

In step 402, position error signal generator 254 compares the present lateral position to a desired lateral position and transmits a position error signal via position signal lines 238 to a servo controller 241. The servo controller generates a servo control signal and provides it on control lines 242 to a servo positioning mechanism at head system 180 which moves the head assembly laterally with respect to the servo band to a desired lateral position or to maintain the servo read head at a desired lateral position with respect to the servo band 227 during track following.

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage medium (s) having computer readable program code embodied thereon.

Any combination of one or more computer readable storage medium(a) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method of timing within a timing based servo band arranged in a sequence of frames having sub-frames with non-parallel servo stripes in sequentially adjacent sub-frames of a linear tape, said timing based servo band sensed by a servo read head having a sensing width less than the width of said timing based servo band, said servo read head and said timing based servo band moved relative to each other in the longitudinal direction, comprising:
   determining a first time interval (A) of said servo read head between a first pair of non-parallel servo stripes of a sub-frame;
   determining a second time interval (B) of said servo read head between a second pair of parallel servo stripes of sequentially adjacent sub-frames, said second pair of servo stripes comprising one servo stripe of said first pair;
   determining a third time interval (C) of said servo read head between a third pair of non-parallel servo stripes intermediate said first time intervals (A), said servo stripes of said sequentially adjacent sub-frames, said third pair of servo stripes comprising one servo stripe of said first pair, wherein said third time interval (C) third pair of servo stripes comprise a second servo stripe of said first pair, and a first servo stripe of a sequentially succeeding first pair; and
   generating position signals that are a function of said first and second time intervals, and that are a function of said third and second time intervals, said position signals related to a lateral position of said servo read head with respect to said servo band.

2. The method of claim 1, wherein said function of said first and second time intervals comprises a ratio of (A) to (B), and said function of said third and second time intervals comprises a ratio of [(B) less (C)] to (B).

3. The method of claim 1, wherein,
   when the value of (A) is greater than the value of (B)/2, said step of generating position signals comprises generating position signals that are a function of said first and second time intervals as a ratio of (A) to (B); and
   when the value of (A) is less than the value of (B)/2, said step of generating position signals comprises generating position signals that are a function of said third and second time intervals as a ratio of [(B) less (C)] to (B).

4. The method of claim 3, additionally comprising continuing to generate position signals without switching between said steps of generating position signals until said value of (A) differs from (B)/2 by at least a predetermined hysteresis factor.

5. The method of claim 1, additionally comprising the step of determining a fourth time interval (D) of said servo read head between a fourth pair of parallel servo stripes of sequentially adjacent sub-frames, said fourth pair of servo stripes comprising servo stripes other than those of said second pair; and said step of generating said position signals comprises generating position signals that are a function of said first and second time intervals; and that are a function of said third and fourth time intervals.

6. The method of claim 5, wherein said step of determining a second time interval (B) is between a second pair of parallel servo stripes of sequentially adjacent sub-frames; and said step of determining a fourth time interval is between a fourth pair of servo stripes of sequentially adjacent sub-frames; said second pair of servo stripes and fourth pair of servo stripes interleaved with each other and non-parallel to each other pair.

7. The method of claim 6, wherein said function of said first and second time intervals comprises a ratio of (A) to (B), and said function of said third and fourth time intervals comprises a ratio of [(D) less (C)] to (D).

8. A servo decoder system configured to provide position error signals of at least one servo read head with respect to a timing based servo band of a linear tape, said servo read head having a sensing width less than the width of said timing based servo band, said servo read head configured to read at least one transition of servo stripes of a timing based servo band as said timing based servo band and said servo read head are moved relative to each other in the longitudinal direction, said servo band arranged in a sequence of frames having sub-frames with non-parallel servo stripes in sequentially adjacent sub-frames said servo read head, comprising:
   timing apparatus responsive to said at least one servo read head, configured to determine a first time interval (A) between a first pair of non-parallel servo stripes of a sub-frame; to determine a second time interval (B) between a second pair of parallel servo stripes of sequentially adjacent sub-frames, said second pair of servo stripes comprising one servo stripe of said first pair; and to determine a third time interval (C) between a third pair of non-parallel servo stripes intermediate said first time intervals (A), said servo stripes of said sequentially adjacent sub-frames, said third pair of servo stripes comprising one servo stripe of said first pair, wherein said third pair of servo stripes of said timing apparatus said third time interval (C) comprise a second servo stripe of said first pair, and a first servo stripe of a sequentially succeeding first pair;
   a position signal generator configured to generate position signals that are a function of said first and second time intervals, and that are a function of said third and second time intervals; and
   a position error signal generator configured to generate position error signals in accordance with said generated position signals.

9. The servo decoder system of claim 8, wherein said function of said position signal generator first and second time intervals comprises a ratio of (A) to (B), and said function of said third and second time intervals comprises a ratio of [(B) less (C)] to (B).

10. The servo decoder system of claim 8, wherein said position signal generator is configured to,
    when the value of (A) is greater than the value of (B)/2, generate position signals that are a function of said first and second time intervals as a ratio of (A) to (B); and
    when the value of (A) is less than the value of (B)/2, generate position signals that are a function of said third and second time intervals as a ratio of [(B) less (C)] to (B).

11. The servo decoder system of claim 10, wherein said position signal generator additionally is configured to continue to generate position signals without switching between said position generation functions until said value of (A) differs from (B)/2 by at least a predetermined hysteresis factor.

12. The servo decoder system of claim 8, wherein said timing apparatus additionally is configured to determine a fourth time interval (D) of said servo read head between a fourth pair of parallel servo stripes of sequentially adjacent sub-frames, said fourth pair of servo stripes comprising servo stripes other than those of said second pair; and said position signal generator is additionally configured to generate position signals that are a function of said first and second time intervals; and that are a function of said third and fourth time intervals.

13. The servo decoder system of claim 12, wherein said timing apparatus is configured to determining said second time interval (B) between a second pair of parallel servo stripes of sequentially adjacent sub-frames; and configured to determine said fourth time interval between a fourth pair of servo stripes of sequentially adjacent sub-frames; said second pair of servo stripes and fourth pair of servo stripes interleaved with each other and non-parallel to each other pair.

14. The servo decoder system of claim 13, wherein said function of said first and second time intervals comprises a ratio of (A) to (B), and said function of said third and fourth time intervals comprises a ratio of [(D) less (C)] to (D).

15. A data storage drive, comprising:
a read/write head configured to read and write data with respect to data of a linear tape, said read/write head additionally comprising at least one servo read head at least one servo read head with respect to a timing based servo band of said linear tape, said servo read head having a sensing width less than the width of said timing based servo band, said servo read head configured to read at least one transition of servo stripes of a timing based servo band as said timing based servo band and said servo read head are moved relative to each other in the longitudinal direction, said servo band arranged in a sequence of frames having sub-frames with non-parallel servo stripes in sequentially adjacent sub-frames said servo read head;
a servo decoder system, comprising:
timing apparatus responsive to said at least one servo read head, configured to determine a first time interval (A) between a first pair of non-parallel servo stripes of a sub-frame; to determine a second time interval (B) between a second pair of parallel servo stripes of sequentially adjacent sub-frames, said second pair of servo stripes comprising one servo stripe of said first pair; and to determine a third time interval (C) between a third pair of non-parallel servo stripes intermediate said first time intervals (A), said servo stripes of said sequentially adjacent sub-frames, said third pair of servo stripes comprising one servo stripe of said first pair, wherein said third pair of servo stripes of said timing apparatus said third time interval (C) comprise a second servo stripe of said first pair, and a first servo stripe of a sequentially succeeding first pair;
a position signal generator configured to generate position signals that are a function of said first and second time intervals, and that are a function of said third and second time intervals; and
a position error signal generator configured to generate position error signals in accordance with said generated position signals; and
a servo controller and actuator configured to respond to said generated position error signals to translate said read/write head transversely with respect to said linear tape.

16. The data storage drive of claim 15, wherein said function of said position signal generator first and second time intervals comprises a ratio of (A) to (B), and said function of said third and second time intervals comprises a ratio of [(B) less (C)] to (B).

17. The data storage drive of claim 15, wherein said servo decoder system position signal generator is configured to,
when the value of (A) is greater than the value of (B)/2, generate position signals that are a function of said first and second time intervals as a ratio of (A) to (B); and
when the value of (A) is less than the value of (B)/2, generate position signals that are a function of said third and second time intervals as a ratio of [(B) less (C)] to (B).

18. The data storage drive of claim 17, wherein said servo decoder system position signal generator additionally is configured to continue to generate position signals without switching between said position generation functions until said value of (A) differs from (B)/2 by at least a predetermined hysteresis factor.

19. The data storage drive of claim 15, wherein said servo decoder system timing apparatus additionally is configured to determine a fourth time interval (D) of said servo read head between a fourth pair of parallel servo stripes of sequentially adjacent sub-frames, said fourth pair of servo stripes comprising servo stripes other than those of said second pair; and said position signal generator is additionally configured to generate position signals that are a function of said first and second time intervals; and that are a function of said third and fourth time intervals.

20. The data storage drive of claim 19, wherein said servo decoder system timing apparatus is configured to determining said second time interval (B) between a second pair of parallel servo stripes of sequentially adjacent sub-frames; and configured to determine said fourth time interval (D) between a fourth pair of servo stripes of sequentially adjacent sub-frames; said second pair of servo stripes and fourth pair of servo stripes interleaved with each other and non-parallel to each other pair.

21. The data storage drive of claim 20, wherein said function of said first and second time intervals comprises a ratio of (A) to (B), and said function of said third and fourth time intervals comprises a ratio of [(D) less (C)] to (D).

22. A computer program product for providing timing information with respect to a timing based servo band arranged in a sequence of frames having sub-frames with non-parallel servo stripes in sequentially adjacent sub-frames of a linear tape, said timing based servo band sensed by a servo read head having a sensing width less than the width of said timing based servo band, said servo read head and said timing based servo band moved relative to each other in the longitudinal direction, said computer program product comprising a non-transitory computer readable storage medium having computer readable program code, wherein said computer readable program code, when executed on a computer processing system, causes said computer processing system to:
determine a first time interval (A) of said servo read head between a first pair of non-parallel servo stripes of a sub-frame;
determine a second time interval (B) of said servo read head between a second pair of parallel servo stripes of sequentially adjacent sub-frames, said second pair of servo stripes comprising one servo stripe of said first pair;
determine a third time interval (C) of said servo read head between a third pair of non-parallel servo stripes intermediate said first time intervals (A), said servo stripes of said sequentially adjacent sub-frames, said third pair of servo stripes comprising a second servo stripe of said first pair, and a first servo stripe of a sequentially succeeding first pair, wherein said third pair of servo stripes of said timing apparatus said third time interval (C) comprise a second servo stripe of said first pair, and a first servo stripe of a sequentially succeeding first pair; and generate position signals that are a function of said first and second time intervals, and that are a function of said third and second time intervals, said position signals related to a lateral position of said servo read head with respect to said servo band.

23. A method of timing within a timing based servo band arranged in a sequence of frames having sub-frames with non-parallel servo stripes in sequentially adjacent sub-frames of a linear tape, said timing based servo band sensed by a servo read head having a sensing width less than the width of said timing based servo band, said servo read head and said timing based servo band moved relative to each other in the longitudinal direction, comprising:

determining a first time interval (A) of said servo read head between a first pair of non-parallel servo stripes of a sub-frame;

determining a second time interval (C) of said servo read head between a second pair of non-parallel servo stripes intermediate said first time intervals (A), said servo stripes of said sequentially adjacent sub-frames, said second pair of servo stripes comprising a second servo stripe of said first pair, and a first servo stripe of a sequentially succeeding first pair; and generating position signals that are a function of said first (A) and second (C) time intervals, said position signals related to a lateral position of said servo read head with respect to said servo band, wherein said function of said first and second time intervals comprises a ratio of (A) to [(A) plus (C)].

24. The method of claim 23, wherein said method is a sequentially updating function of said first (A) and second (C) time intervals, comprising sequentially updating said ratio with an updated (A) alternating with an updated (C).

25. A servo decoder system configured to provide position error signals of at least one servo read head with respect to a timing based servo band of a linear tape, said servo read head having a sensing width less than the width of said timing based servo band, said servo read head configured to read at least one transition of servo stripes of a timing based servo band as said timing based servo band and said servo read head are moved relative to each other in the longitudinal direction, said servo band arranged in a sequence of frames having sub-frames with non-parallel servo stripes in sequentially adjacent sub-frames said servo read head, comprising:

timing apparatus responsive to said at least one servo read head, configured to determine a first time interval (A) between a first pair of non-parallel servo stripes of a sub-frame; to determine a second time interval (C) between a second pair of non-parallel servo stripes intermediate said first time intervals (A), said servo stripes of said sequentially adjacent sub-frames, said second pair of servo stripes comprising a second servo stripe of said first pair, and a first servo stripe of a sequentially succeeding first pair;

a position signal generator configured to generate position signals that are a function of said first (A) and second (C) time intervals, wherein said function of said position signal generator first and second time intervals comprises a ratio of (A) to [(A) plus (C)]; and a position error signal generator configured to generate position error signals in accordance with said generated position signals.

26. The servo decoder system of claim 25, wherein said timing apparatus and said position signal generator are configured to provide a sequentially updated function of said first (A) and second (C) time intervals, comprising sequentially updating said ratio with an updated (A) alternating with an updated (C).

27. A data storage drive, comprising:

a read/write head configured to read and write data with respect to data of a linear tape, said read/write head additionally comprising at least one servo read head at least one servo read head with respect to a timing based servo band of said linear tape, said servo read head having a sensing width less than the width of said timing based servo band, said servo read head configured to read at least one transition of servo stripes of a timing based servo band as said timing based servo band and said servo read head are moved relative to each other in the longitudinal direction, said servo band arranged in a sequence of frames having sub-frames with non-parallel servo stripes in sequentially adjacent sub-frames said servo read head;

a servo decoder system, comprising:

timing apparatus responsive to said at least one servo read head, configured to determine a first time interval (A) between a first pair of non-parallel servo stripes of a sub-frame; to determine a second time interval (C) between a second pair of non-parallel servo stripes intermediate said first time intervals (A), said servo stripes of said sequentially adjacent sub-frames, said second pair of servo stripes comprising second servo stripe of said first pair, and a first servo stripe of a sequentially succeeding first pair;

a position signal generator configured to generate position signals that are a function of said first (A) and second (C) time intervals, wherein said function of said position signal generator first (A) and second (C) time intervals comprises a ratio of (A) to [(A) plus (C)]; and a position error signal generator configured to generate position error signals in accordance with said generated position signals; and a servo controller and actuator configured to respond to said generated position error signals to translate said read/write head transversely with respect to said linear tape.

28. The data storage drive of claim 27, wherein said timing apparatus and said position signal generator are configured to provide a sequentially updated function of said first (A) and second (C) time intervals, comprising sequentially updating said ratio with an updated (A) alternating with an updated (C).

29. A computer program product for providing timing information with respect to a timing based servo band arranged in a sequence of frames having sub-frames with non-parallel servo stripes in sequentially adjacent sub-frames of a linear tape, said timing based servo band sensed by a servo read head having a sensing width less than the width of said timing based servo band, said servo read head and said timing based servo band moved relative to each other in the longitudinal direction, said computer program product comprising a non-transitory computer readable storage medium having computer readable program code, wherein said computer readable program code, when executed on a computer processing system, causes said computer processing system to:

determine a first time interval (A) of said servo read head between a first pair of non-parallel servo stripes of a sub-frame;

determine a second time interval (C) of said servo read head between a second pair of non-parallel servo stripes intermediate said first time intervals (A), said servo stripes of said sequentially adjacent sub-frames, said second pair of servo stripes comprising a second servo stripe of said first pair, and a first servo stripe of a sequentially succeeding first pair; and generate position signals that are a function of said first (A) and second (C) time intervals, said position signals related to a lateral position of said servo read head with respect to said servo band, wherein said function of said position signal generator first (A) and second (C) time intervals comprises a ratio of (A) to [(A) plus (C)].

* * * * *